United States Patent Office 3,493,285
Patented Feb. 3, 1970

3,493,285
MICROSCOPE SELECTIVE ILLUMINATOR
Edward Charles Howard and Graham Townsend Parkyn, Barnet, England, assignors to W. Watson & Sons Limited, Barnet, England, a British company
Filed Dec. 13, 1966, Ser. No. 601,391
Claims priority, application Great Britain, Dec. 17, 1965. 53,747/65
Int. Cl. G02b 21/06
U.S. Cl. 350—87                                5 Claims

ABSTRACT OF THE DISCLOSURE

Illuminating apparatus for an object under examination in transmitted light microscopy comprises a sub-stage condenser lens assembly, a ground glass screen having a superimposed convex lens surface, a source of light positioned to illuminate the whole surface of the ground glass screen substantially uniformly, and a concave mirror arranged to increase the illumination of a central area only of the ground glass screen by the addition of reflected light rays when required during high power microscopic operation.

---

The invention relates to microscopes and particularly to illuminating apparatus for use with microscopes.

The invention provides illuminating apparatus for illuminating an object in a microscope adapted to view the object by transmitted light, which apparatus comprises a source of light, light diffusing means positioned to receive light from the source, imaging means for imaging the light leaving the diffusing means and reflecting means positioned on the side of the source remote from the diffusing means and arranged to reflect light from the source onto a limited area of the diffusing means.

Preferably, selectively operable means are provided to prevent light being reflected from the source onto the said limited area of the diffusing means when required.

Preferably, a converging lens device is provided on the side of the diffusing means remote from the source to tend to collect light which would otherwise be scattered from the diffusing means.

Preferably, the diffusing means comprises a ground glass screen and the converging lens device comprises a plano-convex lens having the ground glass screen at its plane surface.

Preferably, said reflecting means comprises a concave mirror.

The said selectively operable means may comprise means for moving the reflecting means out of position. Alternatively, it may comprise an opaque screen movable to a position in which it prevents light being reflected by the reflecting means to the diffusing means.

The invention also provides an illumination system for an object examination in transmitted light microscopy, comprising a sub-stage condenser lens assembly, a ground glass screen having a convex lens surface superimposed, a source of illumination such as an electric lamp positioned to illuminate the whole surface of the ground glass screen in a substantially uniform manner, and a concave mirror arranged to increase the illumination of a central area of the said ground glass screen by the addition of reflected light rays from the lamp. Means are provided to select either uniform illumination of the said screen or the additionally increased illumination of the central area.

The invention includes a microscope for viewing an object by transmitted light having illuminating apparatus as aforesaid arranged to illuminate an object.

Figure 1:
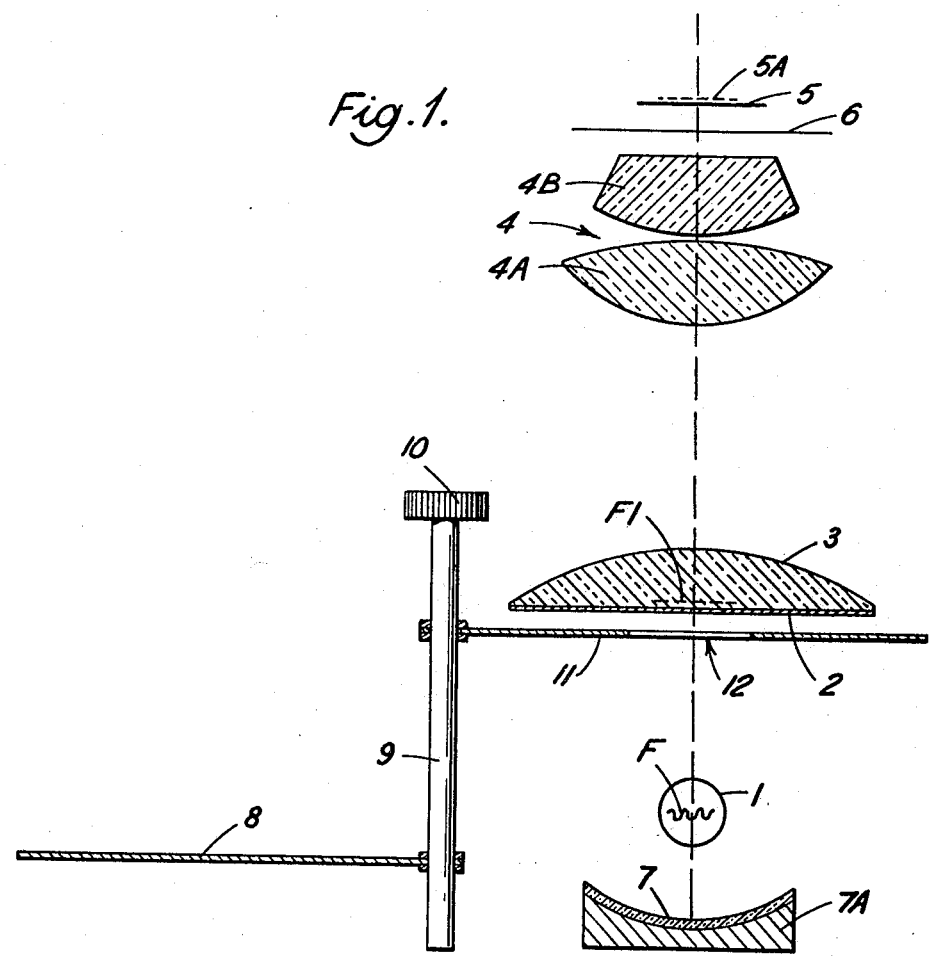
Figure 2:
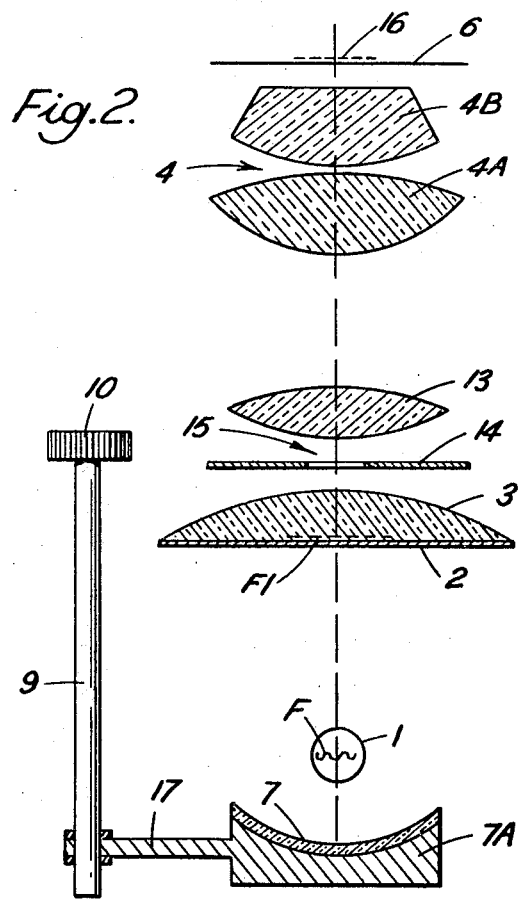

Two embodiments of the invention will now be described by way of example and with reference to the accompanying drawings in which:

FIGURE 1 is a diagrammatic representation of one microscope illumination system embodying the invention, and FIGURE 2 is a diagrammatic representation of a different microscope illumination system embodying the invention.

Both these examples are for illuminating an object in a microscope adapted to view the object, mounted on a transparent slide, by transmitted light. In use, the apparatus shown in the drawings is mounted on the side of the object remote from the eyepiece of the microscope.

Referring to FIGURE 1, the illuminating apparatus comprises an electric lamp 1, having a filament F, which illuminates a ground glass screen 2 having a convex lens surface 3 superimposed. A sub-stage condenser lens assembly 4, comprising lenses 4A and 4B receives the light rays from the lens surface 3 to produce an image 5 of the illuminated ground screen 2 near to, but not actually in, the plane 6 of the object being viewed in the microscope. The ground glass screen 2 acts as a diffusing device and is positioned adjacent the plane surface of a plano-convex lens providing the convex surface 3. The lens having the surface 3 tends to collect some of the light which would otherwise be scattered from the outer areas of the screen 2. The screen 2 is sufficiently large that its image in plane 5 completely illuminates the field of view of the lowest power microscope objective that is to be used with the apparatus. The light falling on the screen 2 directly from the lamp 1 produces substantially uniform illumination over the entire area of the screen 2. A concave mirror 7, in a support 7A, is placed below the lamp 1 in such a position that additional light is reflected onto the limited central area of the ground screen 2. An enlarged image FI of the filament may be thus formed at the center of the ground screen. This filament image FI, which need not be critically sharp, must be large enough for its own image 5A near the object plane 6 to be slightly larger than the field of view of a high power objective, and under these conditions the object is illuminated more intensely over the area viewed by the high power objective lens owing to the light reflected by the mirror. Substitution of a low power objective in the microscope for the high power objective would increase the field of view in the object plane and result in an unevenly illuminated area of the object within the objective field, but even illumination of the ground glass screen 2 and therefore of the object plane can be restored by interposing an opaque mask 8 between the mirror and lamp. In FIGURE 1 the mirror 7 is rigidly fixed in the position shown, and to prevent the above uneven illumination when required, an opaque screen 8 may be selectively moved between the mirror 7 and the lamp 1 to prevent light from the latter falling on and being reflected by the mirror. The screen 8 is mounted on a rod 9 carried in bearings (not shown) in the microscope base, and rotation of the rod 9 by a control knob 10 swings the screen 8 into or out of the mirror masking position in accordance with the objective lens employed.

The performance of the device may be improved by introducing an opaque screen 11, having a suitable aperture 12, immediately below the ground glass screen 2, the aperture 12 being slightly larger than the image FI of the filament formed on the ground screen 2 by the mirror 7. The effect of this is to cut out light outside the field of the objective which would otherwise be scattered within the optical system and cause degradation in contrast. The introduction of the screen 11 may be performed in the same manner as for the screen 8, the arrangement being such that when screen 8 masks the mirror 7, screen 11 is not interposed between the lamp 1 and the ground glass screen 2, and when the mirror 7 is unmasked or in the position shown the screen 11 is correctly positioned below the ground glass screen 2. A method of achieving this is to mount the screen 11 on the supporting rod 9 as shown in FIGURE 1.

FIGURE 2 shows an alternative arrangement to that of FIGURE 1 in which instead of providing an opaque mask 8, the mirror 7 is mounted on an arm 17 of the rotatable rod 9 so that the mirror 7 may be swung out of position, away from the optical axis of the apparatus, when it is required to restore uniform illumination to the entire area of the screen 2. Parts shown in FIGURE 2 which are similar to parts in FIGURE 1 have similar reference numerals.

Sub-stage condenser lens assemblies may be designed to form an image on the microscope object slide of a (field) iris diaphragm situated some ten inches from the object slide. In FIGURE 2 the addition of lens 13, of suitable focal length, enables the sub stage condenser to focus an iris diaphragm 14 and any aperture 15 therein placed above the ground secreen 2 on to, and produce an image 16 of the aperture 15 on, the plane 6 of the object slide. Adjustment of the iris aperture 15 will therefore control the area of illumination of the object slide, such adjustment being made to illuminate only the field of view of the objective in use, additional illumination of the ground glass screen being provided when required by the mirror 7.

It will be seen that use of the mirror 7 in the above examples is advantageous in providing a high intensity of illumination in the limited central region of the object plane in miscroscope with high power objectives where the small field of view utilizes only a small central area of the screen 2, but a high intensity of illumination is required. Furthermore, the performance with a low power objective is not impaired as means are provided for preventing light being reflected by the mirror 7, when a low power objective is used, so that uniform illumination is then provided over the entire area of the screen 2.

We claim:
1. Illuminating apparatus for an object under examination in transmitted light microscopy, comprising; a sub-stage condenser lens assembly, a lamp, a plano-convex lens positioned between the lamp and said condenser lens assembly, said condenser lens assembly, lamp and plano-convex lens being aligned along an optical axis, a diffusing element on the plane surface of said plano-convex lens facing said lamp, said plano-convex lens collecting light diffused from said diffusing element, said diffusing element being positioned along said optical axis with respect to said lamp to be illuminated substantially uniformly thereby, a concave mirror positioned on the side of said lamp remote from said plano-convex lens to reflect light from said lamp onto a limited central area of said diffusing element, a selectively operable device positioned adjacent said optical axis having a first position and a second position, said selectively operable device in said first position preventing light being reflected from said concave mirror onto said diffusing element, and said selectively operable device in said second position enabling light to be reflected from said concave mirror onto said diffusing element.

2. Illuminating apparatus as claimed in claim 1 wherein said selectively operable device includes a rotary control member positioned parallel to said optical axis, and mounting means attaching said concave mirror to said rotary control member whereby rotation of said rotary control member moves said concave mirror into said first and second positions.

3. Illuminating apparatus as claimed in claim 1 wherein said selectively operable device includes a rotary control member positioned parallel to said optical axis and an opaque screen mounted on said rotary control member whereby rotation of said control member moves said opaque screen into a position between said lamp and said concave mirror corresponding to said first position and also into a position enabling reflected light to impinge on said diffusing element corresponding to said second position.

4. Illuminating apparatus as claimed in claim 3 further comprising a second apertured opaque screen mounted on said rotary control member, said first and second screens being mounted so that a selected screen is located in the optical path of the illuminating apparatus, said second opaque screen having a central aperture overlying said limited central area of said diffusing element with said second opaque screen in position between said lamp and said diffusing element corresponding to said second position.

5. Illuminating apparatus as in claim 1 further comprising an additional lens assembly positioned in said optical axis and an iris diaphragm mounted between said plano-convex lens and said additional lens assembly.

References Cited
UNITED STATES PATENTS

| | | | |
|---|---|---|---|
| 1,234,795 | 7/1917 | Ott | 350—87 |
| 1,505,418 | 8/1924 | Ott | 350—87 |
| 1,724,527 | 8/1929 | Spierer. | |
| 2,351,736 | 6/1944 | Benford | 350—87 |
| 2,667,103 | 1/1954 | Silge | 350—87 |
| 1,971,066 | 8/1934 | Eppenstein | 350—17 |

FOREIGN PATENTS 56,125  6/1912  Austria.

PAUL R. GILLIAM, Primary Examiner

U.S. Cl. X.R.

350—17, 247, 266